United States Patent
Zhou et al.

(10) Patent No.: US 11,105,658 B2
(45) Date of Patent: Aug. 31, 2021

(54) COMPUTATIONAL DISTRIBUTED FIBER-OPTIC SENSING METHOD AND SYSTEM

(71) Applicant: Dalian University of Technology, Dalian (CN)

(72) Inventors: Dapeng Zhou, Dalian (CN); Wei Peng, Dalian (CN)

(73) Assignee: DALIAN UNIVERSITY OF TECHNOLOGY

( * ) Notice: Subject to any disclaimer, the term of this patent is extended or adjusted under 35 U.S.C. 154(b) by 207 days.

(21) Appl. No.: 16/261,631

(22) Filed: Jan. 30, 2019

(65) Prior Publication Data

US 2020/0166384 A1    May 28, 2020
US 2021/0180998 A9    Jun. 17, 2021

(30) Foreign Application Priority Data

Nov. 27, 2018    (CN) .......................... 201811423489.8

(51) Int. Cl.
    *G01D 5/353*     (2006.01)
    *G01K 11/32*     (2021.01)
    (Continued)

(52) U.S. Cl.
    CPC ......... *G01D 5/35364* (2013.01); *G01K 11/32* (2013.01); *G01L 1/242* (2013.01); *G01K 11/322* (2021.01)

(58) Field of Classification Search
    CPC ................ G01D 5/35364; G01L 1/242; G01K 2011/322
    See application file for complete search history.

(56) References Cited

U.S. PATENT DOCUMENTS

| 2010/0091134 A1* | 4/2010 | Cooke ................ H04N 5/232 |
| | | 348/229.1 |
| 2011/0228255 A1* | 9/2011 | Li ...................... G01D 5/35364 |
| | | 356/33 |

(Continued)

FOREIGN PATENT DOCUMENTS

CN      101255951 A      9/2008

OTHER PUBLICATIONS

Tang, J.; Tang, Y.; He, K.; Lu, L; Zhang, D.; Cheng, M.; Deng, L; Liu, D.; Zhang, M. Computational Temporal Ghost Imaging Using Intensity-Only Detection over a Single Optical Fiber. IEEE Photonics J. 2018, 10 (2), 1-9.

*Primary Examiner* — Matthew G Marini
(74) *Attorney, Agent, or Firm* — IP Attorneys Group (57) ABSTRACT

The present invention discloses a computational distributed fiber-optic sensing method and system. The method includes: determining a signal source for modulating intensity of incident light, where the signal source is a binary sequence; using an optical pulse sequence obtained after modulation is performed using the signal source, as an incident light signal, and emitting the incident light signal to an optical fiber; acquiring, according to specified sampling frequency, a scattered light signal obtained through optical fiber scattering; determining, according to the incident light signal and the scattered light signal, a time-domain reconstructed image of a to-be-detected light signal by using a time domain-based differential ghost imaging protocol; and determining a sensing signal of the optical fiber according to the time-domain reconstructed image of the to-be-detected light signal. The computational distributed fiber-optic sensing method and system provided in the present invention feature low sampling frequency, low device complexity, and low costs.

13 Claims, 6 Drawing Sheets

(51) Int. Cl.
  *G01L 1/24* (2006.01)
  *G01K 11/322* (2021.01)

(56) References Cited

U.S. PATENT DOCUMENTS

2015/0188626 A1* 7/2015 Viswanathan ....... H04B 10/071
                                                   398/21
2017/0205255 A1* 7/2017 Nannipieri ......... G01D 5/35364

* cited by examiner

COMPUTATIONAL DISTRIBUTED FIBER-OPTIC SENSING METHOD AND SYSTEM

This application claims priority to Chinese application number 201811423489.8, filed Nov. 27, 2018, with a title of COMPUTATIONAL DISTRIBUTED FIBER-OPTIC SENSING METHOD AND SYSTEM. The above-mentioned patent application is incorporated herein by reference in its entirety.

TECHNICAL FIELD

The present invention relates to the field of distributed optical fiber sensing to technologies, and particularly, to a computational distributed fiber-optic sensing method it and system.

BACKGROUND

A distributed fiber-optic sensing system is used to detect and analyze a special optical effect in an optical fiber, so as to perform measurement to obtain feature information of the optical fiber. Because the feature information of the optical fiber changes due to influence of an external environment, environmental parameters distributed in space around the optical fiber, such as temperature, stress, and pressure, can be perceived. A distributed fiber-optic sensing component can use a standard optical fiber as a sensing element, and measure a change of each point of the sensing optical fiber, to implement distributed measurement of an external event. Compared with a conventional discrete sensing technology, a superior advantage of the distributed fiber-optic sensing system is that it can implement long-distance continuous measurement, and has a capability of performing continuous measurement within greater than dozens or even hundreds of kilometers. The distributed fiber-optic sensing system is implemented by using natural scattering processes in the optical fiber, for example, Rayleigh scattering, Raman scattering, and spontaneous or stimulated Brillouin scattering, and completes signal demodulation by using a time-domain technique or a frequency-domain technique, to implement the measurement. Generally, for long distance measurement (greater than dozens of kilometers) and to achieve a meter-order spatial resolution, a time-domain technique is normally used because the time-domain distributed fiber-optical sensing system has a simple structure and high enough system bandwidth. In a frequency-domain technique, direct current light needs to be used generally, therefore limiting a measurement distance that can be implemented by using the frequency-domain technique. In a conventional time-domain distributed sensing technology, an optical pulse is sent to an optical fiber; backscattered light is acquired by using a photodetector; and after the backscattered light is converted into a time-domain electrical signal by the photodetector, the time-domain electrical signal is acquired by using a high-speed data acquisition card, where the high-speed data acquisition card whose sampling rate needs to satisfy a Nyquist-Shannon sampling theorem can provide specific spatial information, that is, a sampling time interval needs to be less than half a pulse width. The pulse width determines a spatial resolution of the distributed sensing system. Therefore, in a conventional distributed sensing system based on a time-domain technique, an acquisition module generally needs to have sampling frequency of higher than 100 MHz, so as to obtain a spatial readout resolution less than 1 m. For a high-performance long-distance sensing system, because the signal at far end of the optical fiber is relatively weak, a high resolution analog-to-digital converter is needed for sampling to obtain a high enough dynamic range. Therefore, a high-performance analog-to-digital converter and a field-programmable gate array need to be integrated to so the acquisition module, so as to perform high-speed transmission and processing of a large amount of data. Hardware costs, design costs, and programming costs are relatively high. This is also a major factor why the distributed sensing system has a higher price than conventional sensor, thereby limiting larger-scale applications of the distributed sensing system.

SUMMARY

An objective of the present invention is to provide a computational distributed fiber-optic sensing method and system, which feature low sampling rate, low device complexity, and low costs.

To achieve the above purpose, the present invention provides the following solution:

A computational distributed fiber-optic sensing method, including:

determining a signal source for modulating intensity of incident light, where the signal source is a binary sequence;

using an optical pulse sequence obtained after modulation is performed using the signal source, as an incident light signal, and emitting the incident light signal to an optical fiber;

acquiring, according to specified sampling frequency, a scattered light signal obtained through optical fiber scattering;

determining, according to the incident light signal and the scattered light signal, a time-domain reconstructed image of a to-be-detected light signal by using a time domain-based differential ghost imaging protocol; and determining a sensing signal of the optical fiber according to the time-domain reconstructed image of the to-be-detected light signal.

Optionally, the signal source is a binary forward sequence generated by using a Walsh-Hadamard matrix and a binary inverse sequence corresponding to the binary forward sequence.

Optionally, the signal source is a random binary sequence.

Optionally, the determining, according to the incident light signal and the scattered light signal, a time-domain reconstructed image of a to-be-detected light signal by using a time domain-based differential ghost imaging protocol specifically includes:

determining the time-domain reconstructed image of the to-be-detected light signal according to $$S(t) = \left\{ \frac{\langle D \rangle}{\langle R \rangle} + \frac{1}{\langle I(t) \rangle^2} \left[ \langle DI(t) \rangle - \frac{\langle D \rangle}{\langle R \rangle} \langle RI(t) \rangle \right] \right\} / \gamma,$$

where $\gamma$ is a constant, $\langle I(t) \rangle$ is an average of a sum of a plurality of signal source sequences, $\langle D \rangle$ is an average of a sum of a plurality of acquired scattered light signals, and $\langle R \rangle$ is an average of a sum of a plurality of integrated signal source sequences; and when the signal source sequence is a binary sequence generated by using the Walsh-Hadamard matrix, the signal source sequence includes a forward sequence signal source and an inverse sequence signal source, an integrated forward sequence signal source is $R_i=\int_0^T I_i(t)dt$ and $R_i$ is an integral of an $i^{th}$ forward sequence signal source $I_i(t)$ in a duration of one signal source sequence, an integrated inverse sequence signal source is $\tilde{R}_i=\int_0^T \tilde{I}_i(t)dt$ and $\tilde{R}_i$ is an integral of an $i^{th}$ inverse sequence signal source $\tilde{I}_i(t)$ in a duration of one signal source sequence, T is duration of one signal source sequence, $\langle DI(t)\rangle$ is an average of a sum of a plurality of first products, the first products include $D_iI_i(t)$ and $\tilde{D}_i\tilde{I}_i(t)$, $\tilde{D}_i$ an acquired scattered light signal corresponding to the $i^{th}$ forward sequence signal source $I_i(t)$, $\tilde{D}_i$ is an acquired scattered light signal corresponding to the $i_{th}$ inverse sequence signal source $\tilde{I}_i(t)$, $\langle RI(t)\rangle$ is an average of a sum of a plurality of second products, and the second products include and $R_iI_i(t)$ and $\tilde{R}_i\tilde{I}_i(t)$; or when the signal source sequence is a randomly generated binary sequence, an integrated signal source is $R_j=\int_0^T I_j(t)dt$, where $R_j$ is an integral of a $j^{th}$ random signal source sequence $I_j(t)$ in a duration of one signal source sequence, $\langle DI(t)\rangle$ is an average of a sum of a plurality of $D_jI_j(t)$, $D_j$ is an acquired scattered light signal corresponding to the random signal source sequence $I_j(t)$, and $\langle RI(t)\rangle$ is an average of a sum of a plurality of $R_jI_j(t)$.

Optionally, the determining, according to the incident light signal and the scattered light signal, a time-domain reconstructed image of a to-be-detected light signal by using a time domain-based differential ghost imaging protocol specifically includes:

determining the time-domain reconstructed image of the to-be-detected light signal according to $$\begin{bmatrix} S(t_1) \\ S(t_2) \\ \vdots \\ S(t_{2^k}) \end{bmatrix} = \left\{ \frac{1}{2^k} \begin{bmatrix} I_1(t_1)-\tilde{I}_1(t_1) & I_1(t_1)-\tilde{I}_1(t_1) & \ldots & I_1(t_{2^k})-\tilde{I}_1(t_{2^k}) \\ I_2(t_1)-\tilde{I}_2(t_1) & I_2(t_1)-\tilde{I}_2(t_1) & \ldots & I_2(t_{2^k})-\tilde{I}_2(t_{2^k}) \\ \vdots & \vdots & \ddots & \vdots \\ I_{2^k}(t_1)-\tilde{I}_{2^k}(t_1) & I_{2^k}(t_1)-\tilde{I}_{2^k}(t_1) & \ldots & I_{2^k}(t_{2^k})-\tilde{I}_{2^k}(t_{2^k}) \end{bmatrix} \begin{bmatrix} D_1-\tilde{D}_1 \\ D_2-\tilde{D}_2 \\ \vdots \\ D_{2^k}-\tilde{D}_{2^k} \end{bmatrix} \right\} / \gamma,$$

where S(n) is a to-be-detected light signal at a moment n, $I_m(n)$ is a signal source value of an $m^{th}$ forward sequence signal source at the moment n, $\tilde{I}_m(n)$ is a signal source value of an $m^{th}$ inverse sequence signal source at the moment n, $D_m$ is an acquired scattered light signal corresponding to the $m^{th}$ forward sequence signal source, $\tilde{D}_m$ is an acquired scattered light signal corresponding to the $m^{th}$ inverse sequence signal source, and γ is a constant.

Optionally, after the determining, according to the incident light signal and the scattered light signal, a time-domain reconstructed image of a to-be-detected light signal by using a time domain-based differential ghost imaging protocol and before the determining a sensing signal of the optical fiber according to the time-domain reconstructed image of the to-be-detected light signal, the method further includes:

adjusting a trigger signal delay of a signal source sequence or a trigger signal time delay of a signal acquiring device, to redetermine a time-domain reconstructed image of the to-be-detected light signal; and interleaving, point by point, the time-domain reconstructed image of the to-be-detected light signal determined before adjustment of the trigger signal delay with the time-domain reconstructed image of the to-be-detected light signal determined after adjustment of the trigger signal delay, to obtain a new time-domain reconstructed image of the to-be-detected light signal.

A computational distributed fiber-optic sensing system includes:

a signal source determining module, configured to determine a signal source for modulating intensity of incident light, where the signal source is a binary sequence;

an incident light modulation module, configured to use an optical pulse sequence obtained after modulation is performed using the signal source, as an incident light signal, and emit the incident light signal to an optical fiber;

a scattered light acquiring module, configured to acquire, according to specified sampling frequency, a scattered light signal obtained through optical fiber scattering; an image reconstruction module, configured to determine, according to the incident light signal and the scattered light signal, a time-domain reconstructed image of a to-be-detected light signal by using a time domain-based differential ghost imaging protocol; and a sensing signal determining module, configured to determine a sensing signal of the optical fiber according to the time-domain reconstructed image of the to-be-detected light signal.

Optionally, the signal source is a binary forward sequence generated by using a Walsh-Hadamard matrix and a binary inverse sequence corresponding to the binary forward sequence; and the image reconstruction module specifically includes:

an image reconstruction unit, configured to determine the time-domain reconstructed image of the to-be-detected light signal according to $$S(t) = \left\{ \frac{\langle D \rangle}{\langle R \rangle} + \frac{1}{\langle I(t) \rangle^2} \left[ \langle DI(t) \rangle - \frac{\langle D \rangle}{\langle R \rangle} \langle RI(t) \rangle \right] \right\} / \gamma,$$

where γ is a constant, $\langle I(t) \rangle$ is an average of a sum of a plurality of signal source sequences, $\langle D \rangle$ is an average of a sum of a plurality of acquired scattered light signals, and $\langle R \rangle$ is an average of a sum of a plurality of integrated signal source sequences; and when the signal source sequence is a binary sequence generated by using the Walsh-Hadamard matrix, the signal source sequence includes a forward sequence signal source and an inverse sequence signal source, an integrated forward sequence signal source is $R_i=\int_0^T I_i(t)dt$ and $R_i$ is an integral of an $i^{th}$ forward sequence signal source $I_i(t)$ in a duration of one signal source sequence, an integrated inverse sequence signal source is $\tilde{R}_i=\int_0^T \tilde{I}_i(t)dt$ and $\tilde{R}_i$ is an integral of an $i^{th}$ inverse sequence signal source $\tilde{I}_i(t)$ in a duration of one signal source sequence, T is duration of one signal source sequence, $\langle DI(t) \rangle$ is an average of a sum of a plurality of first products, the first products include $D_i I_i(t)$ and $\tilde{D}_i \tilde{I}_i(t)$, $D_i$ is an acquired scattered light signal corresponding to the $i^{th}$ forward sequence signal source $I_i(t)$, $\tilde{D}_i$ is an acquired scattered light signal corresponding to the $i^{th}$ inverse sequence signal source $\tilde{I}_i(t)$, $\langle RI(t) \rangle$ is an average of a sum of a plurality of second products, and the second products include $R_i I_i(t)$ and $\tilde{R}_i \tilde{I}_i(t)$; or when the signal source sequence is a randomly generated binary sequence, an integrated signal source is $R_j = \int_0^T I_j(t)dt$, where $R_j$ is an integral of a $j^{th}$ random signal source sequence $I_j(t)$ in a duration of one signal source sequence, $\langle DI(t) \rangle$ is an average of a sum of a plurality of $D_j I_j(t)$, $D_j$ is an acquired scattered light signal corresponding to the $j^{th}$ random signal source sequence $I_j(t)$, and $\langle RI(t) \rangle$ is an average of a sum of a plurality of $R_j I_j(t)$.

Optionally, the signal source is a binary forward sequence generated by using a Walsh-Hadamard matrix and a binary inverse sequence corresponding to the binary forward sequence; and the image reconstruction module specifically includes:

an image reconstruction unit, configured to determine the time-domain reconstructed image of the to-be-detected light signal according to $$\begin{bmatrix} S(t_1) \\ S(t_2) \\ \vdots \\ S(t_{2^k}) \end{bmatrix} = \left\{ \frac{1}{2^k} \begin{bmatrix} I_1(t_1) - \tilde{I}_1(t_1) & I_1(t_1) - \tilde{I}_1(t_1) & \cdots & I_1(t_{2^k}) - \tilde{I}_1(t_{2^k}) \\ I_2(t_1) - \tilde{I}_2(t_1) & I_2(t_1) - \tilde{I}_2(t_1) & \cdots & I_2(t_{2^k}) - \tilde{I}_2(t_{2^k}) \\ \vdots & \vdots & \ddots & \vdots \\ I_{2^k}(t_1) - \tilde{I}_{2^k}(t_1) & I_{2^k}(t_1) - \tilde{I}_{2^k}(t_1) & \cdots & I_{2^k}(t_{2^k}) - \tilde{I}_{2^k}(t_{2^k}) \end{bmatrix} \begin{bmatrix} D_1 - \tilde{D}_1 \\ D_2 - \tilde{D}_2 \\ \vdots \\ D_{2^k} - \tilde{D}_{2^k} \end{bmatrix} \right\} / \gamma,$$

where $S(n)$ is a to-be-detected light signal at a moment n, $I_m(n)$ is a signal source value of an $m^{th}$ forward sequence signal source at the moment n, $\tilde{I}_m(n)$ is a signal source value of an $m^{th}$ inverse sequence signal source at the moment n, $D_m$ is an acquired scattered light signal corresponding to the $m^{th}$ forward sequence signal source, $\tilde{D}_m$ is an acquired scattered light signal corresponding to the $m^{th}$ inverse sequence signal source, and $\gamma$ is a constant.

Optionally, the system further includes:

a trigger signal time delay adjustment module, configured to adjust a trigger signal delay of a signal source sequence or a trigger signal time delay of a signal acquiring device, to redetermine a time-domain reconstructed image of the to-be-detected light signal; and a reconstructed image processing module, configured to interleave, point by point, the time-domain reconstructed image of the to-be-detected light signal determined before adjustment of the trigger signal delay with the time-domain reconstructed image of the to-be-detected light signal determined after adjustment of the trigger signal delay, to obtain a new time-domain reconstructed image of the to-be-detected light signal.

A computational optical time-domain reflectometer uses the computational distributed fiber-optic sensing method provided in the present invention to determine distributed characteristics of an optical fiber.

A computational distributed temperature sensor based on Raman scattering uses the computational distributed fiber-optic sensing method provided in the present invention to determine distributed temperature information along an optical fiber.

A computational Brillouin optical time-domain reflectometer uses the computational distributed fiber-optic sensing method provided in the present invention to determine distributed temperature values and strain values along an optical fiber.

A computational Brillouin optical time-domain analyzer uses the computational distributed fiber-optic sensing method provided in the present invention to determine distributed temperature values and strain values along an optical fiber.

According to specific embodiments of the present invention, the present invention discloses the following technical effects: According to the computational distributed fiber-optic sensing method and system, correlation calculation is performed on a modulated signal of incident light of an optical fiber and an acquired scattered signal of the optical fiber by using a ghost imaging protocol, and a time-domain curve including information about distributed scattered points in the optical fiber that are used for a sensing purpose is reconstructed, and then sensing information of the optical fiber is determined according to the time-domain curve. Compared with a conventional distributed sensing system based on a time-domain technique, accurate sensing information can be obtained without performing high frequency acquisition, so as to reduce sampling rate, thereby reducing device complexity and costs. In addition, a light source signal used to modulate the incident light in the present invention can be generated by using a Walsh-Hadamard matrix. Because the Walsh-Hadamard matrix is orthogonal and there is no redundant information, a signal-to-noise ratio is increased and the reconstruction efficiency of the time-domain curve is also improved significantly.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF EMBODIMENTS

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

An objective of the present invention is to provide a computational distributed fiber-optic sensing method and system, which feature low sampling rate, low device complexity, and low costs.

To make the foregoing objective, features, and advantages of the present invention clearer and more comprehensible, the present invention is further described in detail below with reference to the accompanying drawings and specific embodiments.

The distributed fiber-optic sensing system achieves a sensing purpose by measuring scattering properties of spatial distribution in an optical fiber. An optical pulse needs to be sent to the optical fiber and a backscattered signal of the optical pulse is measured, while the backscattered signal at this time includes information about scattered points in spatial distribution. Since the measurement of the backscattered signal needs to be performed in time domain, spatial information is transformed into time domain information. If the information about the distributed scattered points in spatial distribution is regarded as a spatial image, the backscattered signal in time domain can be similarly regarded as a time-domain image. An optical pulse sequence in a pre-known pattern is emitted to an optical fiber, and the sensing fiber performs integration on backscattered light through a scattering effect, and acquires a backscattered signal at low enough sampling rate. Through correlation calculation, a time-domain image can be reconstructed to achieve a sensing purpose, without a need for continuous high-speed acquisition of scattered signals.

Figure 1:
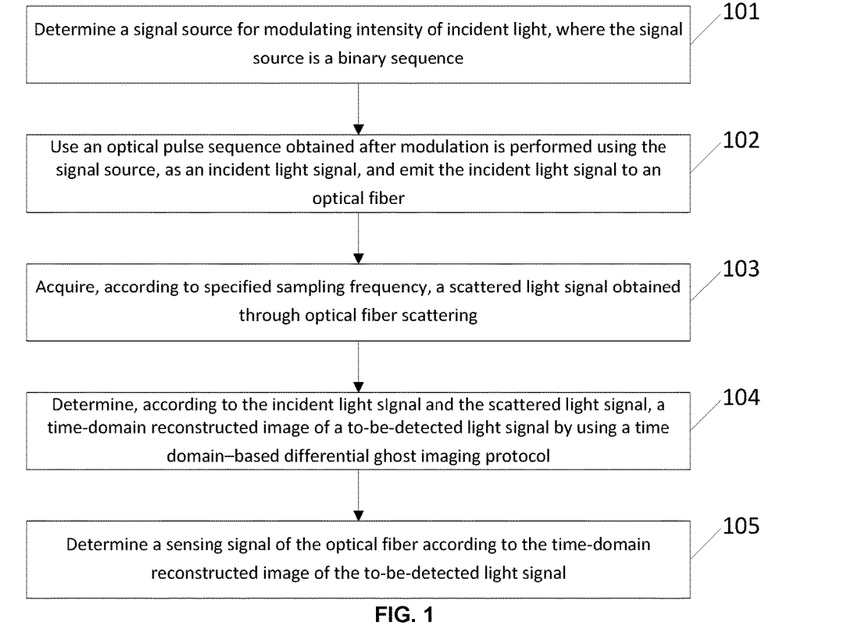
FIG. 1 is a flowchart of a computational distributed fiber-optic sensing method according to an embodiment of the present invention.

In the present invention, light intensity of an incident light signal is modulated to make the incident light signal be in a pattern of a Walsh-Hadamard binary sequence or a random binary sequence, and correlation calculation is performed on known binary sequences and acquired backscattered signals by using a ghost imaging protocol in time domain, to reconstruct a time-domain curve (or referred to as a time domain image) containing information about distributed scattered points in an optical fiber that are used for a sensing purpose, so as to implement a function of distributed fiber-optic sensing. FIG. 1 is a flowchart of a computational distributed fiber-optic sensing method according to an embodiment of the present invention. As shown in FIG. 1, specific steps of the computational distributed fiber-optic sensing method according to this embodiment of the present invention are as follows:

Step 101. Determine a signal source for modulating intensity of incident light, where the signal source is a binary sequence.

Step 102. Use an optical pulse sequence obtained after modulation is performed using the signal source, as an incident light signal, and emit the incident light signal to an optical fiber.

Step 103. Acquire, according to specified sampling frequency, a scattered light signal obtained through optical fiber scattering.

Step 104. Determine, according to the incident light signal and the scattered light signal, a time-domain reconstructed image of a to-be-detected light signal by using a time domain-based differential ghost imaging protocol.

Step 105. Determine a sensing signal of the optical fiber according to the time-domain reconstructed image of the to-be-detected light signal.

In step 101, the signal source is a binary forward sequence generated by using a Walsh-Hadamard matrix and a binary inverse sequence corresponding to the binary forward sequence, or may be a random binary sequence. However, there is a large amount of repeated information in the random binary sequence, and additional noise is introduced into a calculation result. Therefore, a large number of measurements need to be completed to achieve a higher signal to noise ratio, thereby increasing calculation time for reconstruction. The Walsh-Hadamard matrix is orthogonal and there is no redundancy information. Because use of a differential ghost imaging protocol of the Walsh-Hadamard sequence is equivalent to inverse Walsh-Hadamard transformation of a differentiated acquired signal, the present invention can not only accurately reconstruct a scattering curve in time domain, but also greatly reduce the calculation time.

The following describes a process of generating the binary forward sequence and inverse sequence by using the Walsh-Hadamard matrix.

Based on a $2^k$-dimensional Walsh-Hadamard matrix of a natural sequence:

$$H_{2^k} = \begin{bmatrix} H_{2^{k-1}} & H_{2^{k-1}} \\ H_{2^{k-1}} & -H_{2^{k-1}} \end{bmatrix} \quad (1)$$

The foregoing formula is a recursion formula obtained when an integer k≥2, a minimum order of the Walsh-Hadamard matrix is as follows:

$$H_{2^1}\begin{bmatrix} 1 & 1 \\ 1 & -1 \end{bmatrix} \quad (2)$$

The signal intensity of the incident light is modulated to generate a Walsh-Hadamard binary sequence, where each is generated from each row of the matrix in formula (1). A Walsh-Hadamard sequence $I_i(t)$ and an inverse sequence are generated, where i=1, 2, ..., $2^k$ determines a length of the Walsh-Hadamard sequence, and t=$t_1$, $t_2$, ..., $t_{2^k}$ indicates a time of each bit of a sequence. A value of $I_i(t_i)$ in the sequence is a binary value, and when a corresponding value in $H_{2^k}$ is +1, $I_i(t_i)$=1. When a corresponding value in $H_{2^k}$ is −1, $I_i(t_i)$=0. The inverse sequence is defined as $\tilde{I}_i(t)$=1−$I_i(t)$. Total duration of each sequence is T=$2^k\Delta t$, $\Delta t$ is a period of a single bit. Therefore, sampling frequency for acquiring a back signal is set to $$\frac{1}{T},$$

and the sampling frequency is greatly reduced.

Step 103. Acquire, according to specified sampling frequency, a scattered light signal obtained through optical fiber scattering, where the specified sampling frequency is $$\frac{1}{T}.$$

Step 104. An acquired signal $D_i$ corresponding to the incident light signal modulated by using the forward sequence and an acquired signal $\tilde{D}_i$ corresponding to the incident light signal modulated by using the inverse sequence may be expressed as follows:

$$D_i = \gamma \int_0^T I_i(t)S(t)dt \quad (3)$$

$$\tilde{D}_i = \gamma \int_0^T \tilde{I}_i(t)\tilde{S}(t)dt \quad (4)$$

where the constant γ is a responsivity of a photodiode and includes a gain of a subsequent circuit. S(t) indicates to-be-detected scattered light power, includes information about scattering information distributed in the optical fiber, is a time domain image that needs to be reconstructed, and is used to implement a sensing purpose. For Rayleigh scattering, Raman scattering, or spontaneous Brillouin scattering:

$$S(t)=S(z)\approx a(z)P_p(z)\Delta z \quad (5)$$

Where a(z) is the local corresponding backscattering coefficient, z≈ct/2n indicates a position of the optical fiber, n is a group index of refraction in the optical fiber, and c is a speed of light in vacuum; $P_p(z)$ is peak power of a pulse at the position z, and $\Delta z$=c$\Delta t$/2n is an effective scattering length. For a case of stimulated Brillouin scattering, S(t) is the amount of power transferred between the pump power $P_p(z)$ and $P_s(z)$ at location z $$S(t) = S(z) \approx \frac{g(z)}{A_{eff}}P_p(z)P_s(z)\Delta z \quad (6)$$

where g(z) is a local Brillouin gain coefficient, $A_{eff}$ is an effective mode field area of the optical fiber, and $P_s(z)$ is the probe power of continuous-wave light. In this case, $\Delta z$ is a length for interaction between $P_p(z)$ and $P_s(z)$ of the pump and probe light. It is noted that formula (6) is an approximate expression in a case of a small gain and is also a working condition of a high-performance distributed fiber-optic sensing system based on stimulated Brillouin scattering. Under this condition, cases of pump depletion and an excessive amplification can be ignored, to achieve a best sensing effect.

Therefore, S(t) that includes the information about the scattering information distributed in the optical fiber can be regarded as a time domain image, and can be reconstructed by using the following formula:

$$\gamma S(t) = \frac{\langle D \rangle}{\langle R \rangle} + \frac{1}{\langle I(t) \rangle^2}\left[\langle DI(t) \rangle - \frac{\langle D \rangle}{\langle R \rangle}\langle RI(t) \rangle\right] \quad (7)$$

The time-domain reconstructed image of the to-be-detected light signal is determined according to $$S(t) = \left\{ \frac{\langle D \rangle}{\langle R \rangle} + \frac{1}{\langle I(t) \rangle^2}\left[\langle DI(t) \rangle - \frac{\langle D \rangle}{\langle R \rangle}\langle RI(t) \rangle\right] \right\} / \gamma,$$

where γ is a constant, $\langle I(t) \rangle$ is an average of a sum of a plurality of signal source sequences, $\langle D \rangle$ is an average of a sum of a plurality of acquired scattered light signals, and $\langle R \rangle$ is an average of a sum of a plurality of integrated signal source sequences; and when the signal source sequence is a binary sequence generated by using the Walsh-Hadamard matrix, the signal source sequence includes a forward sequence signal source and an inverse sequence signal source, and an integrated forward sequence signal source is $$R_i = \int_0^T I_i(t)dt \quad (8)$$

$R_i$ is an integral of an forward sequence signal source $I_i(t)$ in a duration of one signal source sequence, and an integrated inverse sequence signal source is $$\tilde{R}_i = \int_0^T \tilde{I}_i(t)dt \quad (9)$$

$\tilde{R}_i$ is an integral of an $i^{th}$ inverse sequence signal source $\tilde{I}_i(t)$ in a duration of one signal source sequence, T is duration of one signal source sequence, $\langle DI \rangle$ is an average of a sum of a plurality of first products, the first products include $D_iI_i(t)$ and $\tilde{D}_i\tilde{I}_i(t)$, $D_i$ is an acquired scattered light signal corresponding to the $i^{th}$ forward sequence signal source $I_i(t)$, $\tilde{D}_i$ is an acquired scattered light signal corresponding to the $i^{th}$ inverse sequence signal source $\tilde{I}_i(t)$, $\langle RI(t) \rangle$ is an average of a sum of a plurality of second products, and the second products include $R_j I_i(t)$ and $\tilde{R}_j \tilde{I}_i(t)$; or when the signal source sequence is a randomly generated binary sequence, an integrated signal source is $R_j = \int_0^T I_j(t)dt$, where $R_j$ is an integral of a $j^{th}$ random signal source sequence $I_j(t)$ in a duration of one signal source sequence, $\langle DI(t) \rangle$ is an average of a sum of a plurality of $D_j I_j(t)$, $D_j$ is an acquired scattered light signal corresponding to the $j^{th}$ random signal source sequence $I_j(t)$, and $\langle RI(t) \rangle$ is an average of a sum of a plurality of $R_j I_j(t)$.

Formula (8) and Formula (9) do not need to be measured. It is noted that for $\langle \ldots \rangle$, $N=2^{k+1}$ times of averaging need to be performed. If a random sequence is used, a number of times of averaging is generally much higher than $2^{k+1}$ to obtain a higher signal-to-noise ratio. By using characteristics of the Walsh-Hadamard matrix and the formulas (3), (4), (8) and (9), formula (7) can be simplified to:

$$\gamma \begin{bmatrix} S(t_1) \\ S(t_2) \\ \vdots \\ S(t_{2^k}) \end{bmatrix} = \frac{1}{2^k} \begin{bmatrix} I_1(t_1)-\tilde{I}_1(t_1) & I_1(t_2)-\tilde{I}_1(t_2) & \ldots & I_1(t_{2^k})-\tilde{I}_1(t_{2^k}) \\ I_2(t_1)-\tilde{I}_2(t_1) & I_2(t_2)-\tilde{I}_2(t_2) & \ldots & I_2(t_{2^k})-\tilde{I}_2(t_{2^k}) \\ \vdots & \vdots & \ddots & \vdots \\ I_{2^k}(t_1)-\tilde{I}_{2^k}(t_1) & I_{2^k}(t_2)-\tilde{I}_{2^k}(t_2) & \ldots & I_{2^k}(t_{2^k})-\tilde{I}_{2^k}(t_{2^k}) \end{bmatrix} \begin{bmatrix} D_1-\tilde{D}_1 \\ D_2-\tilde{D}_2 \\ \vdots \\ D_{2^k}-\tilde{D}_{2^k} \end{bmatrix} \quad (10)$$

where $$\begin{bmatrix} D_1-\tilde{D}_1 \\ D_2-\tilde{D}_2 \\ \vdots \\ D_{2^k}-\tilde{D}_{2^k} \end{bmatrix}$$

indicates a vector of differentiated acquired signal; $S(n)$ is a to-be-detected light signal at a moment n, $I_m(n)$ is a signal source value of an $m^{th}$ forward sequence signal source at the moment n, $\tilde{I}_m(n)$ is a signal source value of an $m^{th}$ inverse sequence signal source at the moment n, $D_m$ is an acquired scattered light signal corresponding to the $m^{th}$ forward sequence signal source, $\tilde{D}_m$ is an acquired scattered light signal corresponding to the $m^{th}$ inverse sequence signal source, and $\gamma$ is a constant. Therefore, use of a differential ghost imaging protocol of the Walsh-Hadamard binary sequence is equivalent to inverse Walsh-Hadamard transformation of a differentiated acquired signal. Since the Walsh-Hadamard is orthogonal, the accuracy of the reconstructed image is ensured, and therefore the calculation time can be reduced. Certainly, a random sequence can also be used in the method in the present invention, to achieve the same objective of reducing sampling frequency.

The following describes, by using an example, the computational distributed fiber-optic sensing method provided in the present invention.

Step 1. Determine a length $2^k$ of a Walsh-Hadamard binary sequence and a period $\Delta t$ of a single bit according to a length of a to-be-measured optical fiber and a spatial resolution requirement of distributed sensing that needs to be achieved; and generate a Walsh-Hadamard sequence $I_i(t)$ and an inverse sequence $\tilde{I}_i(t)$ by using a Walsh-hadamard matrix, $(i=1, 2, \ldots, 2^k)$, or generate a random sequence. In this case, sampling frequency of a system may be determined according to a total length of the sequence, where total time of each sequence is $T=2^k \Delta t$. Therefore, $$\frac{1}{T}$$

may be selected as sampling frequency of a back signal system. This step can be implemented by using a computer, a microcontroller, or the like.

Figure 2:
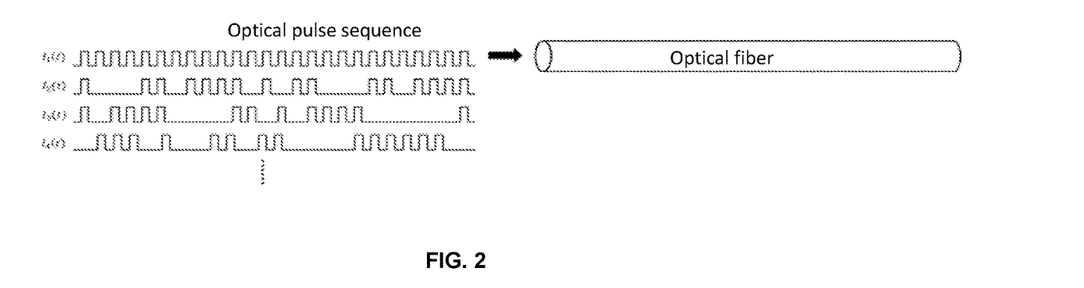
FIG. 2 is a schematic diagram of an optical pulse sequence emitting into an optical fiber according to an embodiment of the present invention.

Step 2. After the sequence is generated, use the sequence as a signal source to modulate light intensity to make the light signal intensity be in a known sequence pattern. In this step, according to different products, in order to implement different functions, different scattered signals need to be measured, while peak power of an optical pulse is adjusted to achieve a best sensing effect. Then, light sequences are sent to the sensing optical fiber successively, as shown in FIG. 2.

Figure 3:
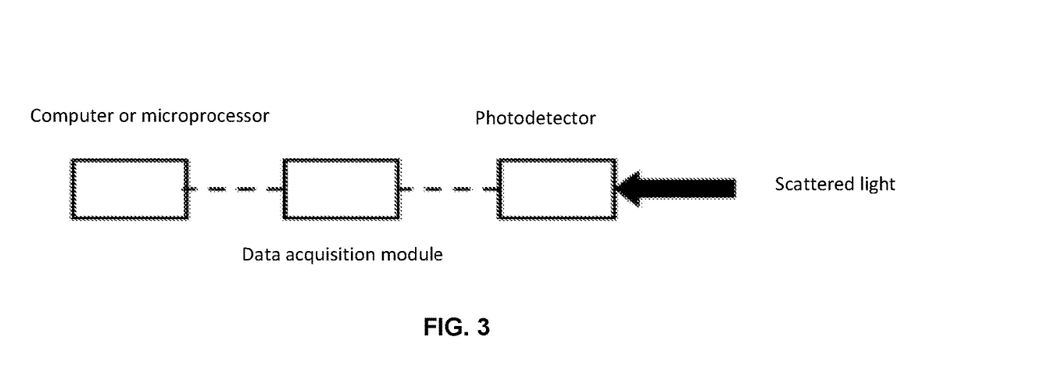
FIG. 3 is a schematic structural diagram of acquisition and processing of scattered light in an optical fiber according to an embodiment of the present invention.

Step 3. A scattered optical signal is converted into an electrical signal through a photodetector, perform sampling through a data acquisition module according to the sampling frequency determined in step 1, to obtain $D_i$ and $\tilde{D}_i$ ($i=1, 2, \ldots, 2^k$), and store $D_i$ and $\tilde{D}_i$ in a computer or microprocessor, as shown in FIG. 3.

Figure 4:
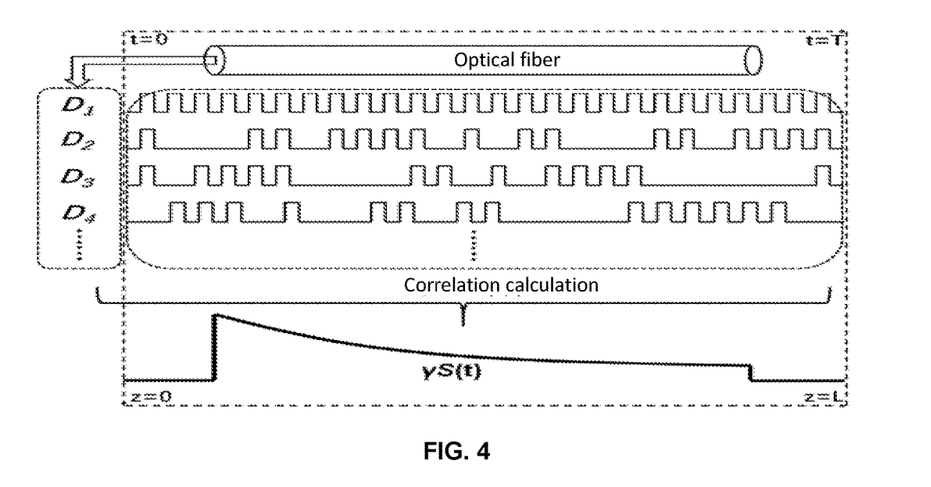
FIG. 4 is a schematic diagram of a processing procedure of an acquired signal of scattered light in an optical fiber according to an embodiment of the present invention.

Step 4. Perform calculation according to formula (7) during measurement of $D_i$ and $\tilde{D}_i$; Alternatively, calculation may be performed according to formula (10) after all $D_i$ and $\tilde{D}_i$ are measured. If the Walsh-Hadamard sequence is not used, but the random sequence is used, only calculation is performed according to formula (7). It can be learned that scattering distribution information of the optical fiber can be obtained by using the calculation method, so as to achieve a sensing purpose. As shown in FIG. 4, A time-domain image obtained through calculation includes information about scattering information distributed in the optical fiber and an interval of sampling points in the time-domain image is equal to duration of a single bit of a known sequence.

Figure 5:
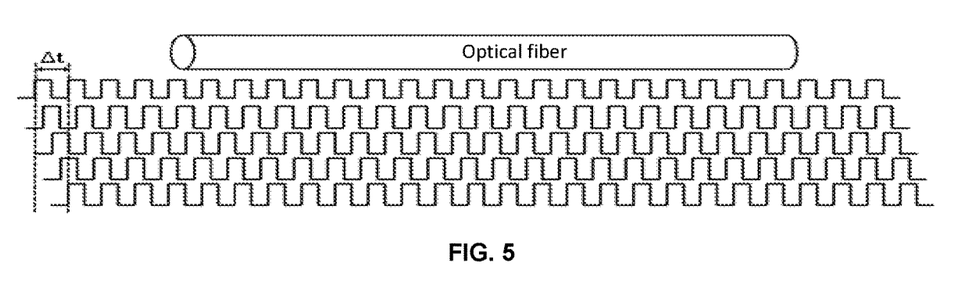
FIG. 5 is a schematic diagram of adjustment of a trigger signal time delay according to an embodiment of the present invention.

Step 5. To increase a number of sampling points of the time-domain image, the following two different schemes can be used:

Scheme 1 is to repeat steps 2 to 4. In step 2, a trigger signal delay of the sequence is adjusted to make a curve reconstructed each time has a small offset in time, where the offset is determined by the trigger delay. The trigger signal delay determines a sampling interval for finally obtaining the time-domain image. A number of repetition times of steps 2 to 4 is M, and can be obtained by dividing the trigger signal delay from the duration of the single bit, as shown in FIG. 5. Therefore, M time-domain images can be obtained.

In scheme 2, M analog-to-digital converters can be used in the data acquisition module in step 3. By controlling a time delay of a trigger signal entering each analog-to-digital converter, a purpose the same as that achieved in scheme 1 is achieved. The trigger signal delay determines a sampling interval of time-domain images. Determining M is the same as the determining method in scheme 1. Therefore, M time-domain images can be obtained at the same time through one measurement.

For scheme 1 or scheme 2, the M time-domain images are interleaved point by point to obtain a final time-domain curve for obtaining sensing information.

Step 6. Perform analysis according to the information about the distributed scattering information in the optical fiber obtained by through calculation, so as to determine the influence on the optical fiber resulting from the outside, and further determine a loss characteristic of the optical fiber, an external temperature change, and a stress change, that is, sensing information may be the loss characteristic of the optical fiber, the external temperature change, or the stress change.

Figure 6:
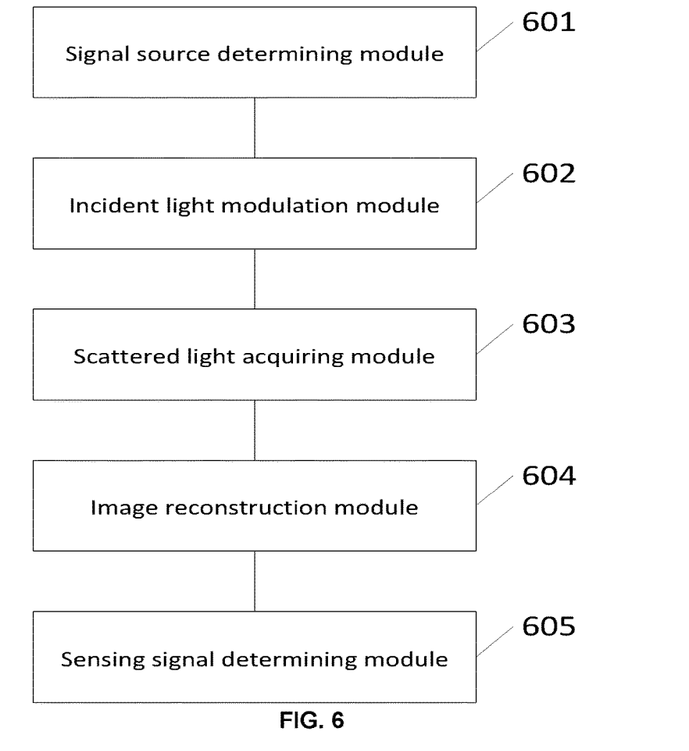
FIG. 6 is a schematic structural diagram of a computational distributed fiber-optic sensing system according to an embodiment of the present invention.

The present invention further provides a computational distributed fiber-optic sensing system. As shown in FIG. 6, the system includes:

a signal source determining module 601, configured to determine a signal source for modulating intensity of incident light, where the signal source is a binary sequence;

an incident light modulation module 602, configured to use an optical pulse sequence obtained after modulation is performed using the signal source, as an incident light signal, and emit the incident light signal to an optical fiber;

a scattered light acquiring module 603, configured to acquire, according to specified sampling frequency, a scattered light signal obtained through optical fiber scattering;

an image reconstruction module 604, configured to determine, according to the incident light signal and the scattered light signal, a time-domain reconstructed image of a to-be-detected light signal by using a time domain-based differential ghost imaging protocol; and a sensing signal determining module 605, configured to determine a sensing signal of the optical fiber according to the time-domain reconstructed image of the to-be-detected light signal.

The signal source may be a binary forward sequence generated by using a Walsh-Hadamard matrix and a binary inverse sequence corresponding to the binary forward sequence, or may be a random binary sequence, and the time-domain reconstructed image of the to-be-detected light signal is determined according to $$S(t) = \left\{ \frac{\langle D \rangle}{\langle R \rangle} + \frac{1}{\langle I(t) \rangle^2} \left[ \langle DI(t) \rangle - \frac{\langle D \rangle}{\langle R \rangle} \langle RI(t) \rangle \right] \right\} / \gamma,$$

where $\gamma$ is a constant, $\langle I(t) \rangle$ is an average of a sum of a plurality of signal source sequences, $\langle D \rangle$ is an average of a sum of a plurality of acquired scattered light signals, and $\langle R \rangle$ is an average of a sum of a plurality of integrated signal source sequences; and when the signal source sequence is a binary sequence generated by using the Walsh-Hadamard matrix, the signal source sequence includes a forward sequence signal source and an inverse sequence signal source, an integrated forward sequence signal source is $R_i = \int_0^T I_i(t)dt$ and $R_i$ is an integral of an $i^{th}$ forward sequence signal source $I_i(t)$ in a duration of one signal source sequence, an integrated inverse sequence signal source is $\tilde{R}_i = \int_0^T \tilde{I}_i(t)dt$ and $\tilde{R}_i$ is an integral of an $i^{th}$ inverse sequence signal source $\tilde{I}_i(t)$ in a duration of one signal source sequence, T is duration of one signal source sequence, $\langle DI(t) \rangle$ is an average of a sum of a plurality of first products, the first products include and $D_i I_i(t)$ and $\tilde{D}_i \tilde{I}_i(t)$, $D_i$ is an acquired scattered light signal corresponding to the $i^{th}$ forward sequence signal source $I_i(t)$, $\tilde{D}_i$ is an acquired scattered light signal corresponding to the inverse sequence signal source $\tilde{I}_i(t)$ $\langle RI(t) \rangle$ is an average of a sum of a plurality of second products, and the second products include $R_i I_i(t)$ and $\tilde{R}_i \tilde{I}_i(t)$; or when the signal source sequence is a randomly generated binary sequence, an integrated signal source is $R_j = \int_0^T I_j(t)dt$, where $R_j$ is an integral of a $j^{th}$ random signal source sequence $I_j(t)$ in a duration of one signal source sequence, $\langle DI(t) \rangle$ is an average of a sum of a plurality of $D_j I_j(t)$, $D_j$ is an acquired scattered light signal corresponding to the $j^{th}$ random signal source sequence $I_j(t)$, and $\langle RI(t) \rangle$ is an average of a sum of a plurality of $R_j I_j(t)$.

When the signal source is a binary forward sequence generated by using a Walsh-Hadamard matrix and a binary inverse sequence corresponding to the binary forward sequence, the time-domain reconstructed image of the to-be-detected light signal may alternatively be determined according to $$\begin{bmatrix} S(t_1) \\ S(t_2) \\ \vdots \\ S(t_{2^k}) \end{bmatrix} = \left\{ \frac{1}{2^k} \begin{bmatrix} I_1(t_1) - \tilde{I}_1(t_1) & I_1(t_2) - \tilde{I}_1(t_2) & \ldots & I_1(t_{2^k}) - \tilde{I}_1(t_{2^k}) \\ I_2(t_1) - \tilde{I}_2(t_1) & I_2(t_2) - \tilde{I}_2(t_2) & \ldots & I_2(t_{2^k}) - \tilde{I}_2(t_{2^k}) \\ \vdots & \vdots & \ddots & \vdots \\ I_{2^k}(t_1) - \tilde{I}_{2^k}(t_1) & I_{2^k}(t_2) - \tilde{I}_{2^k}(t_2) & \ldots & I_{2^k}(t_{2^k}) - \tilde{I}_{2^k}(t_{2^k}) \end{bmatrix} \begin{bmatrix} D_1 - \tilde{D}_1 \\ D_2 - \tilde{D}_2 \\ \vdots \\ D_{2^k} - \tilde{D}_{2^k} \end{bmatrix} \right\} / \gamma,$$

where S(n) is a to-be-detected light signal at a moment n, $I_m(n)$ is a signal source value of an $m^{th}$ forward sequence signal source at the moment n, $\tilde{I}_m(n)$ is a signal source value of an $m^{th}$ inverse sequence signal source at the moment n, $D_m$ is an acquired scattered light signal corresponding to the $m^{th}$ forward sequence signal source, $\tilde{D}_m$ is an acquired scattered light signal corresponding to the $m^{th}$ inverse sequence signal source, and $\gamma$ is a constant.

The system provided in the present invention further provides:

a trigger signal time delay adjustment module, configured to adjust a trigger signal delay of a signal source sequence or a trigger signal time delay of a signal acquiring device, to redetermine a time-domain reconstructed image of the to-be-detected light signal; and a reconstructed image processing module, configured to interleave, point by point, the time-domain reconstructed image of the to-be-detected light signal determined before adjustment of the trigger signal delay with the time-domain reconstructed image of the to-be-detected light signal determined after adjustment of the trigger signal delay, to obtain a new time-domain reconstructed image of the to-be-detected light signal.

According to the computational distributed fiber-optic sensing method and system, correlation calculation is performed on a modulated signal of incident light of an optical fiber and an acquired scattered signal of the optical fiber by using a ghost imaging protocol, and a time-domain curve containing distributed scattering information along the optical fiber that are used for a sensing purpose is reconstructed, and then sensing information of the optical fiber is determined according to the time-domain curve. Compared with a conventional distributed sensing system based on a time-domain technique, accurate sensing information can be obtained without high frequency acquisition, so as to reduce sampling frequency, thereby reducing device complexity and costs. In addition, a light source signal used to modulate the incident light in the present invention can be generated by using a Walsh-Hadamard matrix. Because the Walsh-Hadamard matrix is orthogonal and there is no redundant information, a signal to noise ratio is increased and the reconstruction efficiency of the time domain curve is also improved. In addition, the Walsh-Hadamard matrix does not need to be stored, thereby greatly reducing storage space.

The computational distributed fiber-optic sensing method and system provided in the present invention can be applied to an optical time-domain reflectometer based on Rayleigh scattering, a distributed temperature sensor based on Raman scattering, a Brillouin optical time-domain reflectometer based on spontaneous Brillouin scattering, and a Brillouin optical time-domain analyzer based on stimulated Brillouin scattering.

1. Computational Optical Time-Domain Reflectometer

Figure 7:
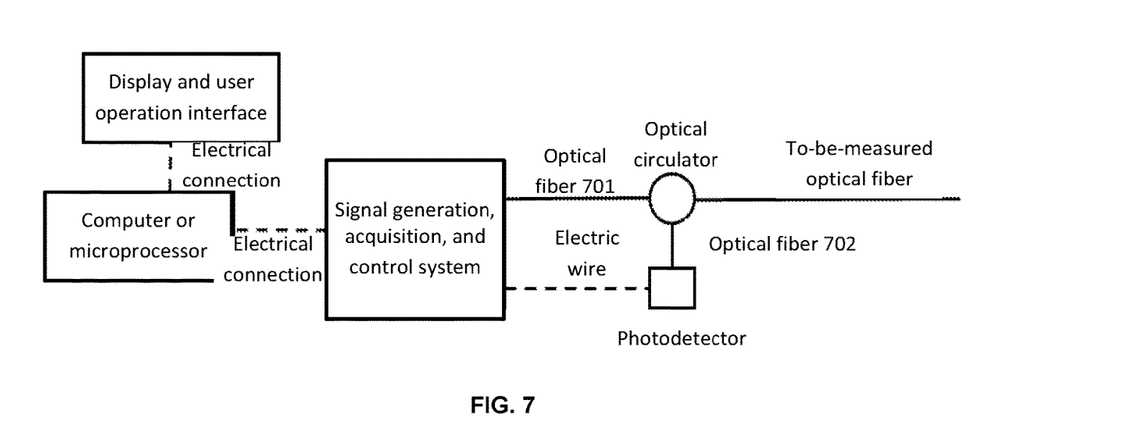
FIG. 7 is a schematic structural diagram of a computational optical time-domain reflectometer according to an embodiment of the present invention.

The computational optical time domain reflectometer measures Rayleigh scattering in an optical fiber to perceive characteristics of a to-be-measured optical fiber, including: a loss, a splicing spot, a connection point, and the like. A main structure thereof is shown in FIG. 7.

Figure 8:
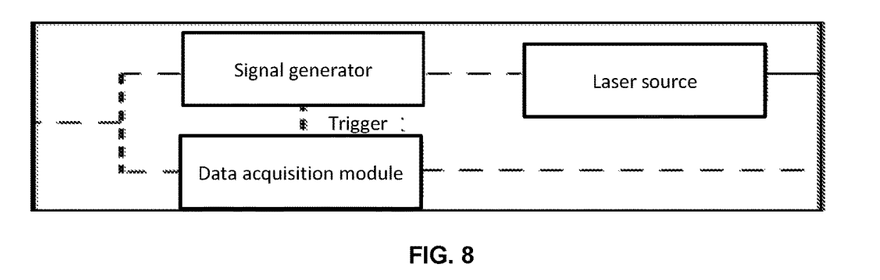
FIG. 8 is a module diagram of a signal generation, acquisition, and control system of a computational optical time domain reflectometer according to an embodiment of the present invention.

A binary sequence that needs to be generated is determined in a computer or a microprocessor according to the method in the present invention, and then a signal generation, acquisition, and control system generates a light sequence, and the light sequence enters an optical circulator through an optical fiber 701. A function of the optical circulator is to allow light to enter the to-be-measured optical fiber only through the optical fiber 701. In the to-be-measured optical fiber, Rayleigh-backscattered light only enters an optical fiber 702. The scattered light is converted to an electrical signal by using a photodetector, and the electrical signal is acquired by the signal generation, acquisition, and control system according to sampling frequency of the method in the present invention. Then the computer or microprocessor performs calculation according to the method in the present invention to obtain a distributed Rayleigh scattering curve of the to-be-measured optical fiber, so as to determine a property of each point of the to-be-measured optical fiber. Finally, a display and user operation interface provides information that a user is interested in. The signal generation, acquisition, and control system is shown in FIG. 8.

A signal generator is synchronized with a data acquisition apparatus through a trigger signal, and the signal generator modulates a laser source to generate a light sequence. A specific product should not be limited to structures shown in FIG. 7 and FIG. 8, and systems of different structures should be protected provided that the method in the present invention is used in the systems.

Compared with an optical time-domain reflectometer in the prior art, the computational optical time domain reflectometer provided in the present invention has a lower requirement on an acquisition module, and therefore complexity and costs of the optical time domain reflectometer are reduced.

2. Computational Distributed Temperature Sensor

Figure 9:
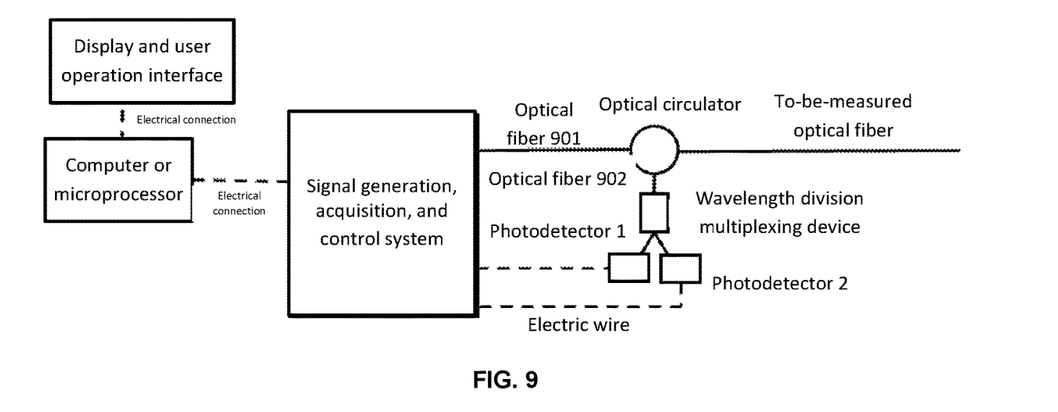
FIG. 9 is a schematic structural diagram of a computational distributed temperature sensor based on Raman scattering according to an embodiment of the present invention.

The computational distributed temperature sensor measures Raman scattering in an optical fiber to perceive temperature distribution of the to-be-measured optical fiber, so as to determine temperature distribution of an ambient environment. A main structure thereof is shown in FIG. 9.

Figure 10:
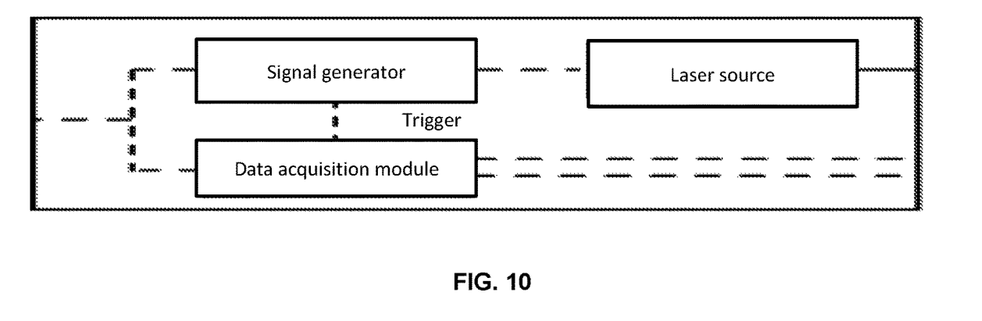
FIG. 10 is a module diagram of a signal generation, acquisition, and control system of a computational distributed temperature sensor based on Raman scattering according to an embodiment of the present invention.

A sequence that needs to be generated is determined in a computer or a microprocessor according to the method in the present invention, and then a signal generation, acquisition, and control system generates a light sequence, and the light sequence enters an optical circulator through an optical fiber 901. A function of the optical circulator is to allow light to enter the to-be-measured optical fiber only through the optical fiber 901. In the to-be-measured optical fiber, Raman-backscattered light only enters an optical fiber 902. The Raman scattered light is divided into two channels of light by using a wavelength division multiplexing device, where one channel of light is Stokes light, and the other channel of light is anti-Stokes light. The two channels of light are converted to two electrical signals, respectively, and the electrical signals are simultaneously acquired by using the signal generation, acquisition, and control system according to sampling frequency of the method in the present invention. Then the computer or microprocessor performs calculation according to the method in the present invention, to obtain two distributed Raman scattering curves of the to-be-measured optical fiber, and then obtains a ratio between the two curves in a point-by-point manner, so as to determine temperature information of each point of the to-be-measured optical fiber. Finally, a display and user operation interface provides temperature information that a user is interested in. The signal generation, acquisition, and control system is shown in FIG. 10. A signal generator is synchronized with a data acquisition apparatus through a trigger signal, and the signal generator modulates a laser source to generate a light sequence. A data acquisition module needs to have two channels for simultaneously performing the data acquisition. A specific product should not be limited to structures shown in FIG. 9 and FIG. 10, and systems of different structures should be protected provided that the method in the present invention is used in the systems.

Compared with a distributed temperature sensor based on Raman scattering in the prior art, the computational distributed temperature sensor based on Raman scattering provided in the present invention has a lower requirement on the acquisition module, and therefore complexity and costs of the distributed temperature sensor are reduced.

3. Computational Brillouin Optical Time-Domain Reflectometer

Figure 11:
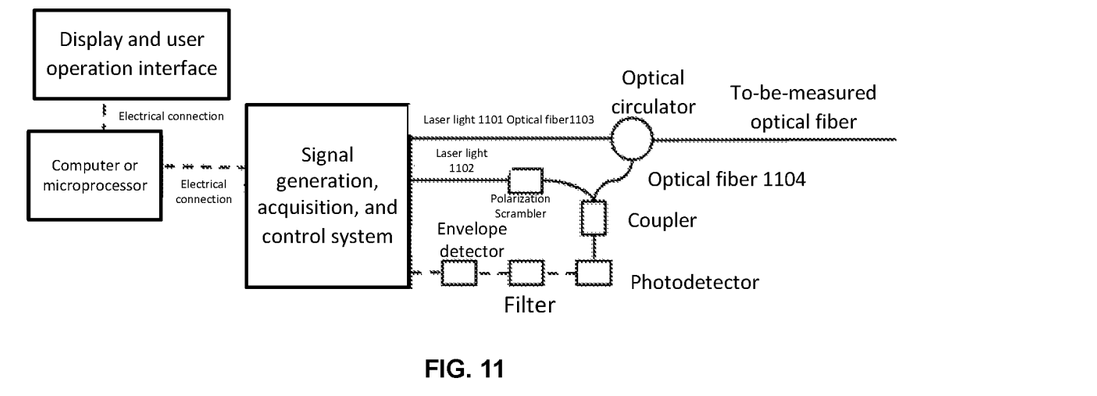
FIG. 11 is a schematic structural diagram of a computational Brillouin optical time-domain reflectometer according to an embodiment of the present invention.

The computational Brillouin optical time-domain reflectometer measures the shift of a distributed Brillouin spectrum (spontaneous Brillouin scattering) in an optical fiber, to perceive an external temperature change or a strain change. A main structure thereof is shown in FIG. 11.

Figure 12:
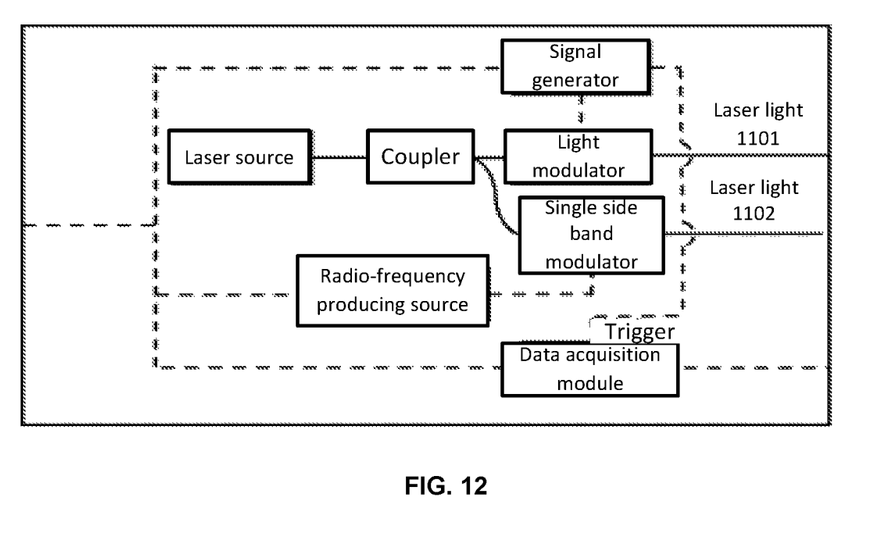
FIG. 12 is a module diagram of a signal generation, acquisition, and control system of a computational Brillouin optical time domain reflectometer according to an embodiment of the present invention.

A frequency difference tuning range and interval between laser light 1101 and laser light 1102 are determined in a computer or a microprocessor, and a required generated sequence is determined according to the method in the present invention. Then a frequency difference between the laser light 1101 and the laser light 1102 is fixed in a signal generation, acquisition, and control system, and an optical sequence (laser 1101) is generated and enters an optical circulator through an optical fiber 1103. A function of the optical circulator is to allow light to enter a to-be-measured optical fiber only through the optical fiber 1103. In the to-be-measured optical fiber, Brillouin-backscattered light only enters an optical fiber 1104. The Brillouin-scattered light is coupled with the laser light 1102 through a coupler. The laser light 1102 is scrambled through a polarization scrambler before being coupled. The polarization scrambler can also be placed on a path of the laser light 1101 in the optical fiber 1103 and disposed between the laser light 1101 and the optical circulator. Light obtained through coupling is converted into an electrical signal through a photodetector and then filtered through a specific electrical filter. An envelope of a filtered signal is detected through an envelope detector and then the filtered signal is acquired by using the signal generation, acquisition, and control system according to the sampling frequency of the present invention. The computer or microprocessor performs calculation according to the method in the present invention to obtain a distributed Brillouin scattering curve at a frequency difference between the laser light 1101 and the laser light 1102. The above steps are repeated to obtain curves by changing frequency difference between the laser light 1101 and the laser light 1102 according to a preset frequency interval. The repeated operations are not stopped until measurement at all preset frequency is completed, so as to obtain the distributed Brillouin spectrum in the optical fiber. Next, spectrums of all points are fitted to obtain a Brillouin frequency value of each point in the optical fiber. Since the Brillouin frequency values become linear to external temperature or strain, so that the temperature and strain can be measured. Finally, a display and user operation interface provides temperature or strain information that a user is interested in. A signal generation, acquisition, and control module is shown in FIG. 12. A laser source is divided into two signals by using the coupler, where one signal passes through a light modulator, to be modulated to a light sequence as the laser light 1101. The sequence conforms to a sequence requirement in the present invention. The other signal passes through a light single side band modulator to change in a frequency to be used as the laser light 1102, the frequency of the signal is controlled by a radiofrequency generation source, so as to determine a frequency difference between the laser light 1101 and the laser light 1102. A signal generator is synchronized with a data acquisition apparatus through a trigger signal. A specific product should not be limited to structures shown in FIG. 11 and FIG. 12, and systems of different structures should be protected provided that the method in the present invention is used in the systems.

Compared with a Brillouin optical time-domain reflectometer in the prior art, the computational Brillouin optical time domain reflectometer provided in the present invention has a lower requirement on an acquisition module, and therefore complexity and costs of the Brillouin optical time domain reflectometer are reduced.

4. Computational Brillouin Optical Time-Domain Analyzer

Figure 13:
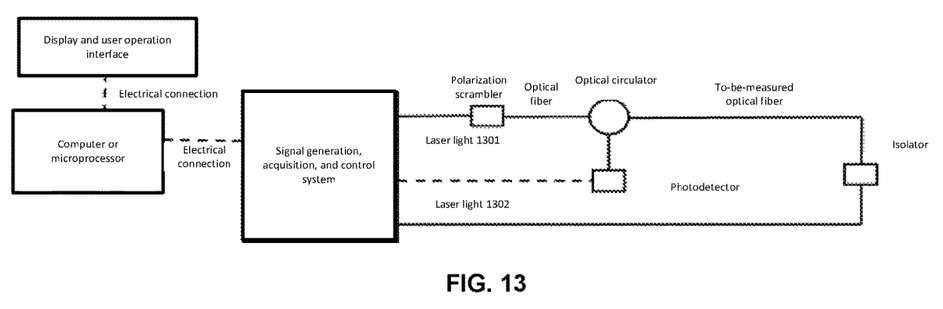
FIG. 13 is a schematic structural diagram of a computational Brillouin optical time-domain analyzer according to an embodiment of the present invention.

The computational Brillouin optical time domain analyzer measures the shift of a distributed Brillouin spectrum (stimulated Brillouin scattering) in an optical fiber, to perceive an external temperature change or a strain change. A main structure thereof is shown in FIG. 13.

Figure 14:
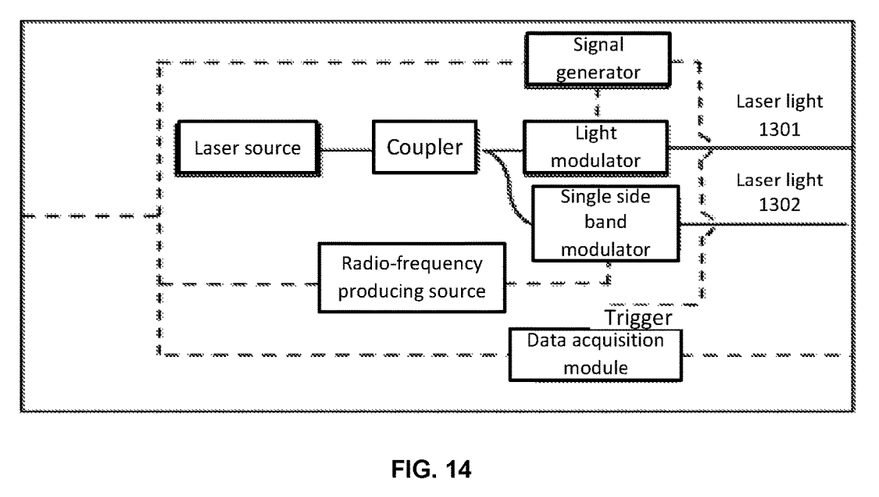
FIG. 14 is a module diagram of a signal generation, acquisition, and control system of a computational Brillouin optical time-domain analyzer according to an embodiment of the present invention.

A frequency difference tuning range and interval between laser light 1301 and laser light 1302 are determined in a computer or a microprocessor, and a required generated sequence is determined according to the method in the present invention. Then a frequency difference between the laser light 1301 and the laser light 1302 is fixed in a signal generation, acquisition, and control system, and an optical sequence (laser light 1301) is generated and enters a polarization scrambler through an optical fiber 1301, and then arrives at an optical circulator. The laser light 1302 enters a to-be-measured optical fiber through an isolator. When the frequency difference between the laser light 1301 and the laser light 1302 is approximate to a Brillouin frequency of the optical fiber, stimulated Brillouin scattering occurs. The laser light 1302 interacts with the laser light 1301 through the to-be-measured optical fiber, and then enter a photodetector through the optical circulator and are converted into an electrical signal, and the electrical signal is then acquired by the signal generation, acquisition, and control system according to sampling frequency of the present invention. The laser light 1301 is isolated by the isolator after passing through the to-be-measured optical fiber. Then the computer or microprocessor performs calculation according to the method in the present invention to obtain a distributed stimulated Brillouin scattering curve at a frequency difference between the laser light 1301 and the laser light 1302. The above steps are repeated to obtain curves by changing frequency difference between the laser light 1301 and the laser light 1302 according to a preset frequency interval. The repeated operations are not stopped until measurement at all preset frequency is completed, so as to obtain the distributed stimulated Brillouin spectrum in the optical fiber. Next, spectrums of all points are fitted to obtain a Brillouin frequency value of each point in the optical fiber. Since the Brillouin frequency values become linear to external temperature or strain, so that the temperature and strain can be measured. Finally, a display and user operation interface provides temperature or strain information that a user is interested in. A signal generation, acquisition and control system is shown in FIG. 14.

Compared with a Brillouin optical time-domain analyzer in the prior art, the computational Brillouin optical time-domain analyzer provided in the present invention has a lower requirement on an acquisition module, and therefore complexity and costs of the Brillouin optical time-domain analyzer are reduced.

Each embodiment of the present specification is described in a progressive manner, each embodiment focuses on the difference from other embodiments, and the same and similar parts between the embodiments may refer to each other. For a system disclosed in the embodiments, since it corresponds to the method disclosed in the embodiments, the description is relatively simple, and reference can be made to the method description. Several examples are used for illustration of the principles and implementation methods of the present invention. The description of the embodiments is used to help illustrate the method and its core principles of the present invention. In addition, those skilled in the art can make various modifications in terms of specific embodiments and scope of application in accordance with the teachings of the present invention. In conclusion, the content of this specification shall not be construed as a limitation to the invention.

What is claimed is:

1. A computational distributed fiber-optic sensing method, comprising: determining a signal source for modulating intensity of incident light, wherein the signal source is a binary sequence; using an optical pulse sequence obtained after modulation is performed using the signal source, as an incident light signal, and emitting the incident light signal to an optical fiber; acquiring, according to specified sampling frequency, a scattered light signal obtained through optical fiber scattering; determining, according to the incident light signal and the scattered light signal, a time-domain reconstructed image of a to-be-detected light signal by using a time domain-based differential ghost imaging protocol; determining a sensing signal of the optical fiber according to the time-domain reconstructed image of the to-be-detected light signal, after the determining, according to the incident light signal and the scattered light signal, a time-domain reconstructed image of a to-be-detected light signal by using a time domain-based differential ghost imaging protocol and before the determining a sensing signal of the optical fiber according to the time-domain reconstructed image of the to-be-detected light signal; adjusting a trigger signal delay of a signal source sequence or a trigger signal time delay of a signal acquiring device, to redetermine a time-domain reconstructed image of the to-be-detected light signal; and interleaving, point by point, the time-domain reconstructed image of the to-be-detected light signal determined before adjustment of the trigger signal delay with the time-domain reconstructed image of the to-be-detected light signal determined after adjustment of the trigger signal delay, to obtain a new time-domain reconstructed image of the to-be-detected light signal.

2. The computational distributed fiber-optic sensing method according to claim 1, wherein the signal source is a binary forward sequence generated by using a Walsh-Hadamard matrix and a binary inverse sequence corresponding to the binary forward sequence.

3. The computational distributed fiber-optic sensing method according to claim 2, wherein the determining, according to the incident light signal and the scattered light signal, a time-domain reconstructed image of a to-be-detected light signal by using a time domain-based differential ghost imaging protocol specifically comprises:
determining the time-domain reconstructed image of the to-be-detected light signal according to $$\begin{bmatrix} S(t_1) \\ S(t_2) \\ \vdots \\ S(t_{2^k}) \end{bmatrix} = \left\{ \frac{1}{2^k} \begin{bmatrix} I_1(t_1) - \tilde{I}_1(t_1) & I_1(t_2) - \tilde{I}_1(t_2) & \cdots & I_1(t_{2^k}) - \tilde{I}_1(t_{2^k}) \\ I_2(t_1) - \tilde{I}_2(t_1) & I_2(t_2) - \tilde{I}_2(t_2) & \cdots & I_2(t_{2^k}) - \tilde{I}_2(t_{2^k}) \\ \vdots & \vdots & \ddots & \vdots \\ I_{2^k}(t_1) - \tilde{I}_{2^k}(t_1) & I_{2^k}(t_2) - \tilde{I}_{2^k}(t_2) & \cdots & I_{2^k}(t_{2^k}) - \tilde{I}_{2^k}(t_{2^k}) \end{bmatrix} \begin{bmatrix} D_1 - \tilde{D}_1 \\ D_2 - \tilde{D}_2 \\ \vdots \\ D_{2^k} - \tilde{D}_{2^k} \end{bmatrix} \right\} / \gamma,$$

wherein S(n) is a to-be-detected light signal at a moment n, $I_m(n)$ is a signal source value of an $m^{th}$ forward sequence signal source at the moment n, $\tilde{I}_m(n)$ is a signal source value of an $m^{th}$ inverse sequence signal source at the moment n, $D_m$ is an acquired scattered light signal corresponding to the $m^{th}$ forward sequence signal source, $\tilde{D}_m$ is an acquired scattered light signal corresponding to the $m^{th}$ inverse sequence signal source, and γ is a constant.

4. The computational distributed fiber-optic sensing method according to claim 2, wherein the determining, according to the incident light signal and the scattered light signal, a time-domain reconstructed image of a to-be-detected light signal by using a time domain-based differential ghost imaging protocol specifically comprises:
determining the time-domain reconstructed image of the to-be-detected light signal according to $$S(t) = \left\{ \frac{\langle D \rangle}{\langle R \rangle} + \frac{1}{\langle I(t) \rangle^2} \left[ \langle DI(t) \rangle - \frac{\langle D \rangle}{\langle R \rangle} \langle RI(t) \rangle \right] \right\} / \gamma,$$

wherein γ is a constant, $\langle I(t) \rangle$ is an average of a sum of a plurality of signal source sequences, $\langle D \rangle$ is an average of a sum of a plurality of acquired scattered light signals, and $\langle R \rangle$ is an average of a sum of a plurality of integrated signal source sequences, the signal source sequence comprises a forward sequence signal source and an inverse sequence signal source, an integrated forward sequence signal source is $R_i = \int_0^T I_i(t)dt$ and $R_i$ is an integral of an $i^{th}$ forward sequence signal source $I_i(t)$ in a duration of one signal source sequence, an integrated inverse sequence signal source is $\tilde{R}_i = \int_0^T \tilde{I}_i(t)dt$ and $\tilde{R}_i$ is an integral of an $i^{th}$ inverse sequence signal source $\tilde{I}_i(t)$ in a duration of one signal source sequence, T is duration of one signal source sequence, $\langle DI(t) \rangle$ is an average of a sum of a plurality of first products, the first products comprise $D_i I_i(t)$ and $\tilde{D}_i \tilde{I}_i(t)$, $D_i$ is an acquired scattered light signal corresponding to the $i^{th}$ forward sequence signal source $I_i(t)$, $\tilde{D}_i$ is an acquired scattered light signal corresponding to the $i^{th}$ inverse sequence signal source $\tilde{I}_i(t)$, $\langle RI(t) \rangle$ is an average of a sum of a plurality of second products, and the second products comprise $R_i I_i(t)$ and $\tilde{R}_i \tilde{I}_i(t)$.

5. The computational distributed fiber-optic sensing method according to claim 1, wherein the signal source is a random binary sequence.

6. The computational distributed fiber-optic sensing method according to claim 5, wherein the determining, according to the incident light signal and the scattered light signal, a time-domain reconstructed image of a to-be-detected light signal by using a time domain-based differential ghost imaging protocol specifically comprises:
determining the time-domain reconstructed image of the to-be-detected signal according to $$S(t) = \left\{ \frac{\langle D \rangle}{\langle R \rangle} + \frac{1}{\langle I(t) \rangle^2} \left[ \langle DI(t) \rangle - \frac{\langle D \rangle}{\langle R \rangle} \langle RI(t) \rangle \right] \right\} / \gamma,$$

wherein γ is a constant, $\langle I(t) \rangle$ is an average of a sum of a plurality of signal source sequences, $\langle D \rangle$ is an average of a sum of a plurality of acquired scattered light signals, and $\langle R \rangle$ is an average of a sum of a plurality of integrated signal source sequences, an integrated signal source is $R_j = \int_0^T I_j(t)dt$, wherein $R_j$ is an integral of a $j^{th}$ random signal source sequence $I_j(t)$ in a duration of one signal source sequence, T is duration of one signal source sequence, $\langle DI(t) \rangle$ is an average of a sum of a plurality of $D_j I_j(t)$, $D_j$ is an acquired scattered light signal corresponding to the $j^{th}$ random signal source sequence $I_j(t)$, and $\langle RI(t) \rangle$ an average of a sum of a plurality of $R_j I_j(t)$.

7. A computational optical time-domain reflectometer, wherein the computational optical time domain reflectometer uses the computational distributed fiber-optic sensing method according to claim 1 to determine distributed characteristics along an optical fiber.

8. A computational distributed temperature sensor based on Raman scattering, wherein the computational distributed temperature sensor uses the computational distributed fiber-optic sensing method according to claim 1 to determine distributed temperature information along an optical fiber.

9. A computational Brillouin optical time-domain reflectometer, wherein the computational Brillouin optical time-domain reflectometer uses the computational distributed fiber-optic sensing method according to claim 1 to determine distributed temperature values and strain values along an optical fiber.

10. A computational Brillouin optical time-domain analyzer, wherein the computational Brillouin optical time domain reflectometer uses the computational distributed fiber-optic sensing method according to claim 1 to determine distributed temperature values and strain values along an optical fiber.

11. A computational distributed fiber-optic sensing system, comprising: a signal source determining module, configured to determine a signal source for modulating intensity of incident light, wherein the signal source is a binary sequence; an incident light modulation module, configured to use an optical pulse sequence obtained after modulation is performed using the signal source, as an incident light signal, and emit the incident light signal to an optical fiber; a scattered light acquiring module, configured to acquire, according to specified sampling frequency, a scattered light signal obtained through optical fiber scattering; an image reconstruction module, configured to determine, according to the incident light signal and the scattered light signal, a time-domain reconstructed image of a to-be-detected light signal by using a time domain-based differential ghost imaging protocol; a sensing signal determining module, configured to determine a sensing signal of the optical fiber according to the time-domain reconstructed image of the to-be-detected light signal, wherein the system further comprises: a trigger signal time delay adjustment module, configured to adjust a trigger signal delay of a signal source sequence or a trigger signal time delay of a signal acquiring device, to redetermine a time-domain reconstructed image of the to-be-detected light signal; and a reconstructed image processing module, configured to interleave, point by point, the time-domain reconstructed image of the to-be-detected light signal determined before adjustment of the trigger signal delay with the time-domain reconstructed image of the to-be-detected light signal determined after adjustment of the trigger signal delay, to obtain a new time-domain reconstructed image of the to-be-detected light signal.

12. The computational distributed fiber-optic sensing system according to claim 11, wherein the signal source is a binary forward sequence generated by using a Walsh-Hadamard matrix and a binary inverse sequence corresponding to the binary forward sequence or the signal source sequence is a randomly generated binary sequence; and the processor is further configured to determine the time-domain reconstructed image of the to-be-detected light signal according to $$S(t) = \left\{ \frac{\langle D \rangle}{\langle R \rangle} + \frac{1}{\langle I(t) \rangle^2} \left[ \langle DI(t) \rangle - \frac{\langle D \rangle}{\langle R \rangle} \langle RI(t) \rangle \right] \right\} \Big/ \gamma,$$

wherein $\gamma$ is a constant, $\langle I(t) \rangle$ is an average of a sum of a plurality of signal source sequences, $\langle D \rangle$ is an average of a sum of a plurality of acquired scattered light signals, and $\langle R \rangle$ is an average of a sum of a plurality of integrated signal source sequences; and when the signal source sequence is a binary sequence generated by using the Walsh-Hadamard matrix, the signal source sequence comprises a forward sequence signal source and an inverse sequence signal source, an integrated forward sequence signal source is $R_i = \int_0^T I_i(t)dt$ and $R_i$ is an integral of an $i^{th}$ forward sequence signal source $I_i(t)$ in a duration of one signal source sequence, an integrated inverse sequence signal source is $\tilde{R}_i = \int_0^T \tilde{I}_i(t)dt$ and $\tilde{R}_i$ is an integral of an $i^{th}$ inverse sequence signal source $\tilde{I}_i(t)$ in a duration of one signal source sequence, T is duration of one signal source sequence, $\langle DI(t) \rangle$ is an average of a sum of a plurality of first products, the first products comprise $D_i I_i(t)$ and $\tilde{D}_i \tilde{I}_i(t)$, $D_i$ is an acquired scattered light signal corresponding to the $i^{th}$ forward sequence signal source $I_i(t)$, $\tilde{D}_i$ is an acquired scattered light signal corresponding to the $i^{th}$ inverse sequence signal source $\tilde{I}_i(t)$, $\langle RI(t) \rangle$ is an average of a sum of a plurality of second products, and the second products comprise $R_i I_i(t)$ and $\tilde{R}_i \tilde{I}_i(t)$; or when the signal source sequence is a randomly generated binary sequence, an integrated signal source is $R_j = \int_0^T I_j(t)dt$, wherein $R_j$ is an integral of a $j^{th}$ random signal source sequence $I_j(t)$ in a duration of one signal source sequence, $\langle DI(t) \rangle$ is an average of a sum of a plurality of $D_j I_j(t)$, $D_j$ is an acquired scattered light signal corresponding to the $j^{th}$ random signal source sequence $I_j(t)$, and $\langle RI(t) \rangle$ is an average of a sum of a plurality of $R_j I_j(t)$.

13. The computational distributed fiber-optic sensing system according to claim 11, wherein the signal source is a binary forward sequence generated by using a Walsh-Hadamard matrix and a binary inverse sequence corresponding to the binary forward sequence; and the processor is further configured to determine the time-domain reconstructed image of the to-be-detected light signal according to $$\begin{bmatrix} S(t_1) \\ S(t_2) \\ \vdots \\ S(t_{2^k}) \end{bmatrix} =$$

$$\left\{ \frac{1}{2^k} \begin{bmatrix} I_1(t_1) - \tilde{I}_1(t_1) & I_1(t_2) - \tilde{I}_1(t_2) & \cdots & I_1(t_{2^k}) - \tilde{I}_1(t_{2^k}) \\ I_2(t_1) - \tilde{I}_2(t_1) & I_2(t_2) - \tilde{I}_2(t_2) & \cdots & I_2(t_{2^k}) - \tilde{I}_2(t_{2^k}) \\ \vdots & \vdots & \ddots & \vdots \\ I_{2^k}(t_1) - \tilde{I}_{2^k}(t_1) & I_{2^k}(t_2) - \tilde{I}_{2^k}(t_2) & \cdots & I_{2^k}(t_{2^k}) - \tilde{I}_{2^k}(t_{2^k}) \end{bmatrix} \right.$$

$$\left.\left.\begin{bmatrix} D_1 - \tilde{D}_1 \\ D_2 - \tilde{D}_2 \\ \vdots \\ D_{2^k} - \tilde{D}_{2^k} \end{bmatrix}\right]\right\}/\gamma$$

wherein $S(n)$ is a to-be-detected light signal at a moment n, $I_m(n)$ is a signal source value of an $m^{th}$ forward sequence signal source at the moment n, $\tilde{I}_m(n)$ is a signal source value of an $m^{th}$ inverse sequence signal source at the moment n, $D_m$ is an acquired scattered light signal corresponding to the $m^{th}$ forward sequence signal source, $\tilde{D}_m$ is an acquired scattered light signal corresponding to the $m^{th}$ inverse sequence signal source, and $\gamma$ is a constant.

\* \* \* \* \*